Aug. 16, 1960 H. H. MUELLER 2,949,310

RECORD SUPPORT AND DRIVE MEANS

Filed Nov. 28, 1956 2 Sheets-Sheet 1

Herman H. Mueller
INVENTOR.

BY Clarence A. O'Brien
and Harvey B. Jacobson
Attorneys

Aug. 16, 1960 H. H. MUELLER 2,949,310

RECORD SUPPORT AND DRIVE MEANS

Filed Nov. 28, 1956 2 Sheets-Sheet 2

Herman H. Mueller
INVENTOR.

BY Clarence A. O'Brien and Harvey B. Jacobson
Attorneys

United States Patent Office 2,949,310
Patented Aug. 16, 1960

2,949,310

RECORD SUPPORT AND DRIVE MEANS

Herman H. Mueller, Ephrata, Pa.; Elizabeth M. Mentzer, executrix of the will of said Herman H. Mueller, deceased Filed Nov. 28, 1956, Ser. No. 624,889

21 Claims. (Cl. 274—10)

This invention comprises a novel and useful record support and drive means and more particularly relates to a mechanism for providing a positive, interlocking supporting and driving engagement for a record disk while the latter may be supported in spaced relation to the turntable or other records directly stacked upon the turntable and driven without slippage thereby, whereby the underside of the record may be played in its supported position and while the record is rotating in the reverse direction from that of the turntable; and whereby a recording may be inscribed upon or reproduced from a record with equal fidelity of tonal production.

The principal object of this invention is to provide a support and drive means whereby a record may be supported above and driven by a turntable or other record with a positive, interlocking, non-slipping engagement, and whereby the supported record may be rotated in an opposite direction from that of the turntable.

A further object of the invention is to provide a device in accordance with the foregoing objects wherein the central portion of a record disk within the sound track of the same may be reinforced and strengthened for interlocking engagement with the corresponding portion of another record, the turntable or the record support and drive means.

Another object is to provide a record disk having the central portion thereof within the sound track thickened relative to the rest of the disk whereby when the records are stacked their weight will be directly carried by the contacting surface of the central portions with their sound track portions prevented from contacting each other.

Yet another object of the invention is to provide a record disk in accordance with the immediately preceding object wherein the thickened central portion of the record disk has a supporting surface for supporting and driving or a supported and driven engagement with a support and drive means.

An additional object is to provide a mechanism whereby a positive, interlocking and non-slipping driving connection may be readily established or disengaged between adjacent records and/or a turntable; and whereby the weight of a record being driven and played above a lower record or turntable may be supported from the latter independently of the driving connection therebetween.

A still further object of this invention is to provide a mechanism in accordance with the foregoing which will enable a record to be supported and driven above a lower record or turntable with any desired clearance therebetween whereby to accommodate the movement of a tone arm for the reproduction of or the inscribing of the top or lower surfaces of records.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figures 2, 10:
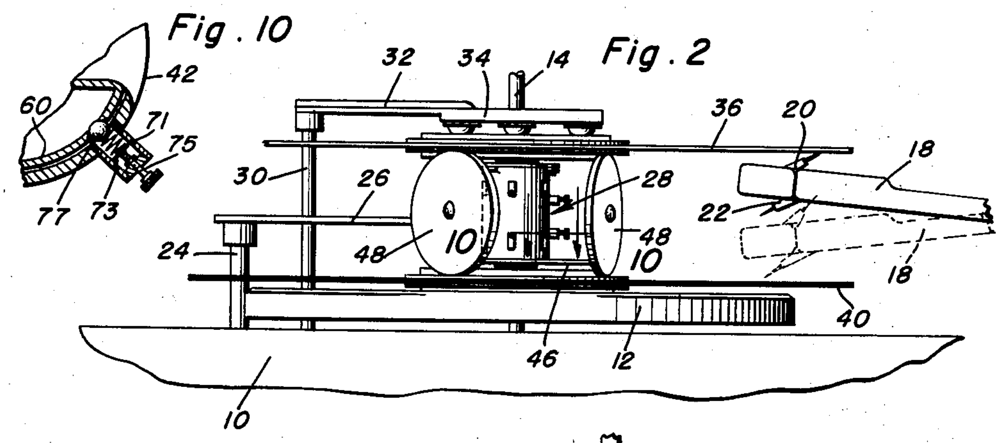
Figure 2 is a side elevation of the arrangement of Figure 1, a portion of the tone arm and its stylus assembly being shown in full lines in a position for playing the underside of the supported record and in dotted lines in a position for playing the top side of a record resting upon the turntable.
Figure 4:
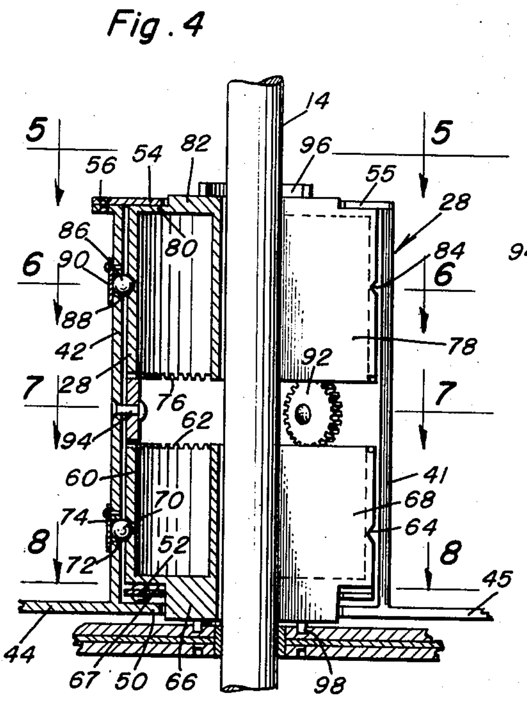
Figure 4 is a view in vertical section through the record support and drive means in operative position upon another record or turntable for driven engagement thereby and being shown in operative position with respect to the spindle of the record player.
Figure 7:
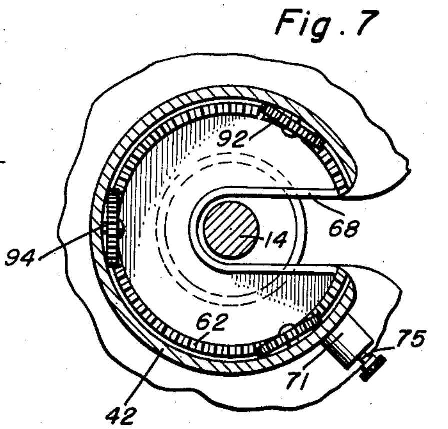
Figure 8:
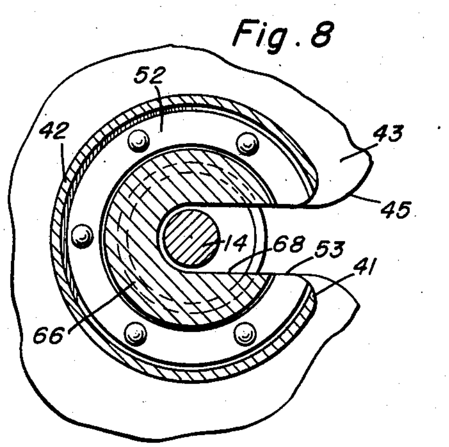
Figure 9:
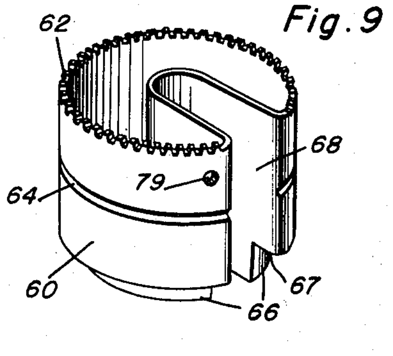
Figure 6:
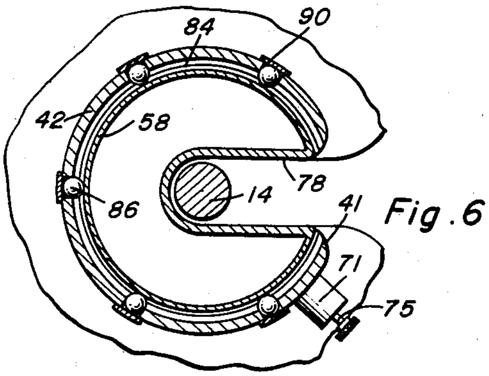

Figures 5, 6, 7 and 8 are horizontal sectional detail views of the record support and drive means, being taken substantially upon the planes indicated by the section lines 5—5, 6—6, 7—7 and 8—8, respectively of Figure 4;

Figure 9 is a perspective view of the lower portion or section of the record support and drive means in accordance with this invention; and Figure 10 is a detail view in horizontal section taken substantially upon the plane indicated by the section line 10—10 of Figure 2 and showing the ball detent construction for insuring alignment and registration of the slots in the upper and lower cylindrical sections.

The invention disclosed in the present application is particularly adapted for use with that type of automatic changing phonograph record player wherein records are automatically fed successively from the bottom of a stack of records supported upon the spindle, the successive records fed from the stack being deposited upon a record support and drive means whereby the record is supported above a turntable and driven therefrom in a reverse direction of rotation, in which elevated position the lower side of the record is played; thereafter the record is lowered to the turntable and the upper side of the record is played as shown in full lines in Figure 2. Such forms of apparatus are in themselves well-known, and the present invention is particularly adapted for use with such forms of apparatus which are disclosed and claimed in my prior Patent No. 2,729,455 for Automatic Interlocking Dual Phonograph Record Player, patented on January 3, 1956; and relates to the same general types and construction of apparatus and record disks as those constituting the subject matter of my co-pending applications Serial Nos. 296,558, filed July 1, 1952; 296,383, filed June 30, 1952; 324,993, filed December 9, 1952; 591,776 and 598,973 filed May 25, 1956.

Figure 1:
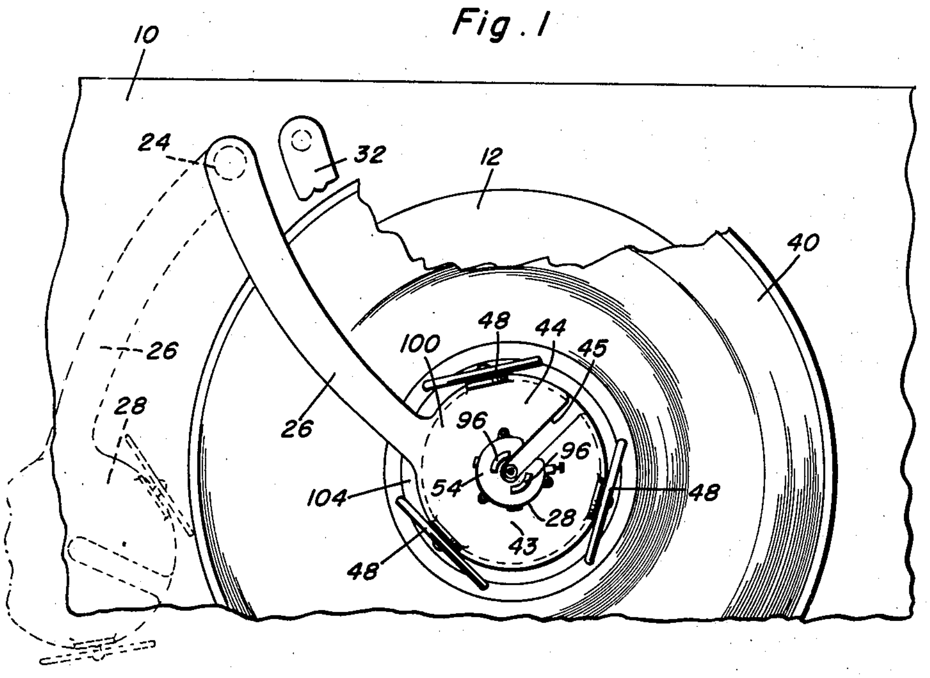
Figure 1 is a fragmentary top plan view of a portion of an automatic phonograph record player and changer to which the present invention has been applied, parts being broken away, and alternative positions of the record support and drive means being shown in full and dotted lines therein.

As will be apparent by referring primarily to Figures 1 and 2, the record player includes a cabinet indicated generally by the numeral 10, upon which is rotatably supported a turntable 12 having the usual operating mechanism therefor, not shown. Disposed centrally of the cabinet and turntable is a spindle 14 upon the upper end of which a stack of records, not shown, is adapted to be supported and sequentially released by the automatic record changing mechanism, which may be of the type disclosed in my prior Patent No. 2,729,455 and my co-pending applications Serial Nos. 318,365 of November 3, 1952 and 359,082 of June 2, 1953.

There is also disclosed the conventional form of tone arm 18 having an upwardly projecting stylus 20 and a downwardly projecting stylus 22. The tone arm and its stylus assembly and operating and control mechanism may be of the type disclosed in my prior Patent No. 2,727,455 and my co-pending applications Serial Nos.

296,558; 367,316 of July 10, 1953; 347,507 of April 8, 1953; 476,732 and 476,731 of November 4, 1954; 591,776 and 598,973 of May 25, 1956.

Also associated with the automatic operating and control mechanism of the record player is a vertically disposed lift rod 24 having a horizontally extending support arm 26 thereon. The record support and drive means indicated generally by the numeral 28 is carried by and is automatically raised and lowered with the arm 26, and is given a horizontal swinging movement therewith in order to selectively position the mechanism 28 for operation as shown in full lines in Figure 1 or to remove the same therefrom during appropriate portions of the cycle of the operation of the automatic record player to the inoperative position shown in dotted lines in Figure 1.

Also indicated at 30 is a second vertically disposed lift rod having a horizontally extending arm 32 which carries a pressure head 34. This pressure head serves to engage the central portion of a record 36 which has been released from a stack of records and deposited atop of the record support and drive means 28, to thereby press the record downwardly thereon into an interlocking driven connection therewith. The construction and operation of the pressure head and its lift rod 30 may conveniently be of the construction shown and claimed in my co-pending application Serial No. 347,507 of April 8, 1953; while the record disk may include the speed control rings of my co-pending application Serial No. 324,993.

In a manner to be now described the record support and drive means 28 is so constructed as to engage at its upper and lower ends with complementary shaped connection constructions carried by the record 36 supported by the support and drive means, or a record 40 carried by the turntable 12 or by the turntable itself.

Referring now especially to Figure 4 it will be seen that the record support and drive means 28 consists of an assembly composed of a non-rotating cylindrical body or casing 42 radially slotted at 41 along the entire axial extent of its wall and having at its open lower end a rigidly attached circularly shaped plate 43 fixedly secured to the arm 26 and provided with a radial slot 45 and with rigidly outwardly projecting radial arms 44 carrying axles 46 upon which are journaled the supporting rollers 48. Although any desired number of rollers may be provided, three have been illustrated for convenience in the drawings.

The open lower end of the cylindrical casing 42 is provided with an annular inturned flange 50 upon which is nonrotatably secured in any suitable manner a roller bearing assembly 52 which is slotted radially at 53 for a purpose to be subsequently set forth. The open upper end of the cylindrical body is provided with an annulus 54 detachably secured thereto as by fastening screws 56, for a purpose to be subsequently set forth and likewise radially slotted at 55. The slots 41, 45, 53 and 55 are alignable in a common vertical plane for a purpose to become subsequently apparent.

Rotatably mounted within the cylindrical body 42 are a pair of interconnected, oppositely rotating toothed upper and lower cylinders or sections 58 and 60 respectively. As shown in Figure 9, the lower cylinder section 60 is provided upon its upper edge with a series of teeth 62 comprising a ring gear of a construction to be described hereinafter. Intermediate its ends, the lower section is provided with a circumferentially extending V-shaped groove 64. At its lower end, the section 60 terminates in a depending cylindrical hub 66 which is diametrically reduced in diameter, is surrounded by the horizontal annular bearing surface 67, and extends through the circular opening within the flange 50, projecting therebeneath for a purpose to be subsequently set forth.

As will be apparent from Figure 9, the lower section 60 is provided with a radially extending slot 68 therein, this slot being formed by re-entrant portions of the circumferentially continuous cylindrical wall of the lower section.

Referring now to Figure 4 it will be seen that the hub portion 66 will extend beneath a flange 50 and beneath the bottom surface of the cylindrical casing 42, while the bearing surface 67 of the lower portion of the cylindrical section 60 which overlies the flange 50 will be journaled thereon by the bearing assembly 52, previously mentioned.

A series of balls 70 are carried in openings 72 disposed circumferentially about the casing 42 and are retained therein as by retainer plugs or caps 74 of any desired construction. These balls 70 ride in the circumferentially extending groove 64 of the lower section 60 and thus serve to center the same as well as to retain the lower section in position against axial movement. If desired, the retainer or closure plugs 74 may be screw threaded into the openings 72, or may be retained as by fasteners of any desired character.

The upper cylinder or section 58 upon its lower edge is likewise provided with a ring gear 76 which is identical with the gear 62 of the lower section. Further, the upper section is provided with a radially disposed slot 78 which is of the same construction and size as the slot 68 of the lower section and is capable of registration therewith. At its upper end the upper section is closed by a top wall 80 having a central cylindrical extension 82 projecting upwardly therefrom. This extension projects upwardly within the circular opening at the center of the retaining annulus 54, and the latter serves to engage the horizontal annular outer portion of the top wall 80 and thereby retain the upper section in the casing 42.

As in the construction of the lower section, the exterior surface of the upper section is provided with a V-shaped circumferentially extending groove 84 similar to the groove 64, and a set of ball bearings 86 retained in openings 88 in the cylindrical casing 42 by retainer caps or plugs 90, are provided, these being of the same construction as that set forth in connection with the lower section.

The two sections are drivingly connected together in a permanent and in a positive, interlocking and non-slipping engagement for reverse rotation, by means of a plurality of wheels 92, each carrier by a stub axle 94 projecting inwardly from the casing 42.

As so far described it will now be apparent that when rotation is imparted to the hub 66 of the lower section, a reverse rotation will be imparted to the upper section by virtue of the intermeshing gears 62, 76 and 92.

The purpose of the radial slots 55, 78, 68, 41, 53 and 45 is to provide passages which may be aligned in a common vertical plane to permit the spindle to move radially into and out of the center of the assembly upon horizontal swinging movement of the arm 26 and of the device 28 carried thereby. Obviously any desired means will be provided to insure registration of these slots for such movement, and the bearing assembly 56 will be suitably held in place with its slot 53 registering with the slots 41 and 45 of the housing 42 and the plate 43.

A satisfactory means for insuring such registration of the various slots will now be described. As shown in Figures 5, 6, 7 and 10, the casing 42 has a laterally projecting housing 71 in which is received a compression spring 73 whose pressure is adjusted by a screw threaded adjusting rod 75. The spring engages a detent ball 77 which is yieldingly urged radially inwardly of the casing 42 against one of the sections such as the lower section 60 where it is engageable in the detent recess 79 therein, see Figures 9 and 10. The positions of the detent ball 77 and of the detent recess 79 are such that when these are engaged the slot 41 of the casing 42 will register with the lower section slots 68, 53 and 45; and through the general connection of 62, 76 and 92, the upper section slots 78 and 55 will likewise register therewith.

Thus rotation of the sections will normally stop with these slots in registration.

If desired a few of the teeth of either or both sections adjacent either or both sides of the slots could be omitted to facilitate stopping of relative rotation of the sections with their slots in registry. Further, if desired, the detent and ball indexing means 77, 79 of the lower section may be duplicated in the upper section 78, if desired.

Figure 3:
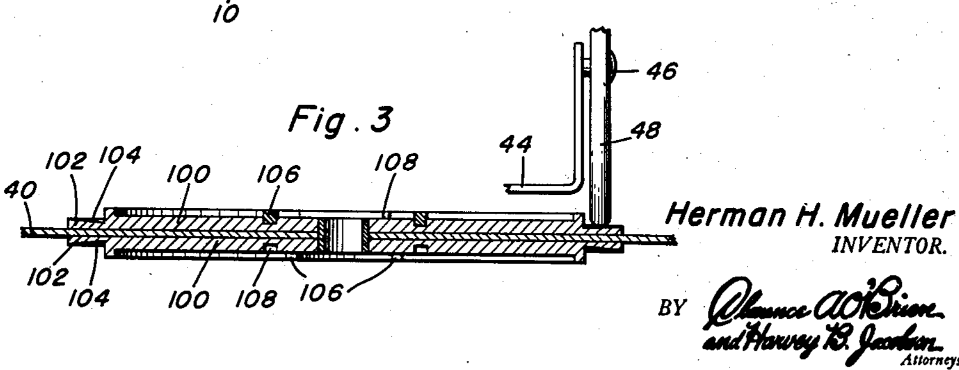
Figure 3 is an enlarged fragmentary view in vertical central section through a portion of a construction of record disk in accordance with this invention.

At this point it should be observed that in the operation of this apparatus the slots 78 and 68 of the upper and lower sections 58 and 60 will always be vertically aligned with each other at that time in the cycle of operation of the record player when the supporting arm 26 and the record support and drive means 28 carried thereby is to be swung horizontally, either to move the same from its retracted and idle position shown in dotted lines in Figure 1 to its inward operative position shown in full lines in Figure 1 and in Figure 3, in which latter position the aligned open slots can permit the spindle 14 to pass thereinto or there out of.

Figure 5:
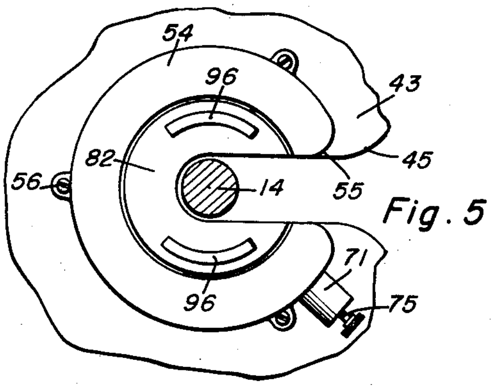

Referring now especially to Figures 1, 4 and 5, it will be seen that the upwardly projecting central extension 82 of the upper section 58 is provided with a pair of arcuate, upwardly projecting ribs 96, each of which is slightly less than 90° in circumferential extent, these ribs being opposite each other. Similarly, the downwardly projecting central hub 66 of the lower section 60 is provided with similarly downwardly projecting arcuate ribs 98. These ribs 96 and 98 constitute locking means whereby complementary shaped surfaces on the records and turntable may cooperate therewith to establish the non-slipping interlocking positive driving connection.

Referring now particularly to Figure 3 it will be seen that the record disks are provided at their central portion and within the sound track of the same with flat circular portions 100. Projecting radially outwardly from the circumference of the portions 100 there are provided annular flanges 102 which are provided with slightly inclined and depressed surfaces 104, adapted to receive and provide a track for the rollers 48, as will be apparent from Figures 1, 2 and 3. The rollers 48 are of such size that the pressure imposed upon the supported record 36 by the pressure head 34 is applied to the lower supporting record 40 and/or the turntable 12 solely through the contact of the inclined annular surfaces 104 upon the thickened portion 100 of the records, whereby the housing 42, the upper and lower sections 58, 60 and the driving engagement of the members 96, 98, 106, 108 are all relieved thereof.

Each of the raised circular portions 100 is provided with a pair of raised diametrically oppositely disposed arcuate ribs 106 which are identical with the ribs 96 and 98 previously mentioned while arcuate recesses 108 struck upon the same radii as the ribs lie between the ends of these ribs. The recesses 108 are slightly greater than 90° extent, while the ribs 106 and also the ribs 96 and 98 are slightly less than 90°, to thereby insure easy engagement of the ribs 96, 98 or 106 into the recesses or channels 108. When so engaged, the lower section will be locked to the turntable or the record 40 carried by the turntable by engagement of the depending ribs 98 in the recesses 108 in the record 40 or in the turntable; adjacent contacting records will be rotationally locked to each other; while the upper record 36 will in turn have its recesses 108 interlocked and engaged by the upwardly projecting ribs 96.

It should be noted that the thickened central portion 100 serves the plural function of strengthening a record against breakage or warping; serves to space and prevent direct contact between the sound tracks of adjacent stacked records even though these may be warped; serves to relieve the stacked records from carrying their weight upon their relatively thin sound track portions and serves to support and establish a driving and driven engagement with the rollers 48.

It should be here observed that the toothed engagement of the wheels 92 with the gears 62 and 76 is a smooth continuous engagement. For that purpose, the contours of the teeth and valleys of these gear surfaces are smoothly and gently rounded, and preferably conforms to the contour of a sinusoidal curve, with no abrupt edges, whereby a smooth and gentle rolling action between the surfaces will be effected.

The dimensions of the ribs and recesses 106 and 108 are such that when a series of records are stacked upon each other, either upon the spindle or upon the turntable, there will be surface to surface contact between the raised portions 100 on opposite sides of each record disk, since the ribs 106 of one record will be received in the complementary recesses 108 of an adjacent record, thereby distributing the loading over the entire area of the portions 100 while the disks are interlocked with each other. Further, the rollers 48 will support the casing 42 of the device 28 whereby the bottom of the same will be out of contact with the cooperating surface of the record or turntable therebeneath, as shown in Figure 4, with the weight of the device being supported upon the tracks 104 by the rollers 48. Thus, there is no friction between the casing 42 and its bottom wall 50 or its supporting arms 44 and the top surface of the turntable of the record carried thereon.

The hereinbefore set forth invention is especially adapted for use with the pressure head control mechanism of my prior co-pending application Serial No. 347,507.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In an apparatus for inscribing or reproducing a message upon a record disk and of the type wherein said record disk is supported upon but in a position above and driven by a turntable or a record disk thereon, a record support and drive means comprising a casing open at its top and bottom, upper and lower cylinder sections, means whereby said sections are mounted in said casing for free rotation, means including gearing in said casing engaging both said sections for relatively reverse rotation, the opposite ends of said sections extending through the open ends of said casing, connecting means on said opposite ends for locking engagement respectively with a record and with a record or turnable.

2. In an apparatus for inscribing or reproducing a message upon a record disk and of the type wherein said record disk is supported upon but in a position above and driven by a turntable or a record disk thereon, a record support and drive means comprising a casing open at its top and bottom, upper and lower cylinder sections, means whereby said sections are mounted in said casing for free rotation, means including gearing in said casing engaging both said sections for relatively reverse rotation, the opposite ends of said sections extending through the open ends of said casing, connecting means on said opposite ends for locking engagement respectively with a record and with a record or turntable, said casing and said sections having means including registerable radial slots extending throughout their entire axial extent for receiving a turntable spindle therein whereby to center said casing and sections about a spindle and means for moving said casing horizontally towards and from a centering position.

3. The combination of claim 1 including record supporting rollers, axles projecting laterally from said casing and journaling said rollers, said rollers being of a diameter greater than the overall axial length of said casing and sections whereby to directly transmit through said rollers the pressure from a record supported by said rollers to a turntable and to relieve said sections and said connecting means from said pressure.

4. The combination of claim 2 including stop means operatively engaging the casing and at least one of said sections for effecting registry of the slots in the casing and in the sections.

5. The combination of claim 1 including a peripheral groove in at least one of said sections, detent balls carried by said casing and engaged in said groove whereby to prevent axial displacement of said section.

6. The combination of claim 2 wherein each section comprises a hollow sleeve with a continuous peripheral wall having a re-entrant portion providing said radial slot.

7. The combination of claim 1 wherein said casing has an inturned flange at its open bottom end, the lower section having a diametrically reduced end extending through said flange, a bearing assembly carried by said flange in said casing and surrounding said reduced end and supporting said lower section.

8. The combination of claim 1 wherein said casing has an inturned flange at its open bottom end, the lower section having a diametrically reduced end extending through said flange, a bearing assembly carried by said flange in said casing and surrounding said reduced end and supporting said lower section, said bearing assembly being fixedly secured to said casing and having a radial slot registering with that of the casing.

9. The combination of claim 1 wherein said gearing includes idler gears rotatably journaled on said casing upon the interior wall thereof, each section having a ring gear engaging said idler gear.

10. The combination of claim 1 wherein said connecting means comprises axially projecting arcuate ribs adapted to mate with complementary arcuate recesses on the cooperating surfaces of a record or turntable.

11. The combination of claim 1 wherein said gearing comprises gear teeth on the adjacent ends of said sections and intermediate gears operatively connecting the gear teeth on both sections.

12. The combination of claim 2 wherein said gearing comprises gear teeth on the adjacent ends of said sections and intermediate gears operatively connecting the gear teeth on both sections, there being at least three circumferentially spaced intermediate gears.

13. The combination of claim 4 wherein said stop means comprises a detent member carried by said casing resiliently engageable with a recess in a section.

14. The combination of claim 1 wherein said connecting means comprises axial projections adapted to mate with complementary elements on the cooperating surfaces of a record or turntable.

15. In an apparatus for inscribing or reproducing a message upon a record disk and of the type wherein said record disk is supported upon but in a position above and driven by a turntable or a record disk thereon, a record support and drive means comprising upper and lower vertically spaced and aligned rotatable members, means retaining said members in relative fixed axial positions, means drivingly connecting said members for relative reverse rotation, connecting means on said upper member for locking and driving engagement with a record supported thereon and connecting means on said lower member for locking with and driven engagement by a turntable or a record thereon.

16. The combination of claim 15 including support means carried by said retaining means and engageable with a turntable or a record disk thereon for supporting from the latter itself and said upper and lower members.

17. The combination of claim 15 including roller means for supporting said members upon a turntable or record disk thereon.

18. In an apparatus for inscribing or reproducing a message upon a record disk and of the type wherein said record disk is supported upon but in a position above and driven by a turntable or a record disk thereon, a turntable, a record support and drive means comprising upper and lower rotatable members, means retaining said members in vertically spaced and aligned positions, means drivingly connecting said members for relative reverse rotations, cooperating complementary means on said lower member and turntable locking them together and effecting rotation of the former by the latter, a record disk engaging and supported by the upper member, cooperating complementary means on said upper member and said record disk locking them together whereby said record disk will be rotated by said turntable and in an opposite direction.

19. The combination of claim 18 wherein said cooperating complementary means includes complementary projections and surfaces.

20. The combination of claim 18 wherein said cooperating complementary means includes complementary projections and surfaces, said projections being on said upper and lower members and said surfaces being on said record disk and turntable.

21. The combination of claim 18 wherein said second record disk has a relatively thickened load bearing surface lying centrally thereof and within the sound track thereof, said support and drive means including supporting rollers resting upon said load bearing surface.

References Cited in the file of this patent

UNITED STATES PATENTS

| | | |
|---|---|---|
| 951,158 | Vogt | Mar. 8, 1910 |
| 1,841,377 | Oranges | Jan. 19, 1932 |
| 2,544,010 | Giannantonio | Mar. 6, 1951 |
| 2,600,573 | Rabkin | June 17, 1952 |

FOREIGN PATENTS

| | | |
|---|---|---|
| 366,995 | Great Britain | Feb. 15, 1932 |
| 707,841 | Great Britain | Apr. 21, 1954 |
| 647,416 | Great Britain | Dec. 13, 1950 |